United States Patent
Rashid et al.

(10) Patent No.: US 8,160,015 B2
(45) Date of Patent: Apr. 17, 2012

(54) SYSTEMS AND METHODS FOR MEASURING AND REDUCING LATENCY OF RADIO LINK FLOWS

(75) Inventors: Mohammed H. Rashid, San Diego, CA (US); Fahed I. Zawaideh, San Diego, CA (US); Anshul Jain, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 368 days.

(21) Appl. No.: 12/606,558

(22) Filed: Oct. 27, 2009

(65) Prior Publication Data

US 2011/0096732 A1    Apr. 28, 2011

(51) Int. Cl.
H04L 12/56    (2006.01)
H04L 13/00    (2006.01)
H04W 28/12   (2009.01)

(52) U.S. Cl. ..... 370/329; 370/351; 370/411; 455/422.1; 455/446

(58) Field of Classification Search .......... 370/248–251, 370/329–389, 401, 411; 455/69, 422.1, 446, 455/560; 709/220–223
See application file for complete search history.

(56) References Cited

U.S. PATENT DOCUMENTS

| 6,735,178 B1 | 5/2004 | Srivastava et al. |
| 6,775,240 B1 | 8/2004 | Zhang et al. |
| 2004/0160927 A1 | 8/2004 | Yang et al. |
| 2005/0091378 A1 | 4/2005 | Nonnenmacher |
| 2006/0029037 A1 | 2/2006 | Chen et al. |
| 2007/0275760 A1* | 11/2007 | Lundh et al. ............ 455/560 |
| 2009/0137252 A1* | 5/2009 | Masseroni et al. ............ 455/446 |

FOREIGN PATENT DOCUMENTS

| WO | WO2005107187 A1 | 11/2005 |
| WO | WO2009082334 A1 | 7/2009 |

OTHER PUBLICATIONS

Eged B., et al., "Server Side Round-Trip Delay Measurements in WAP Environments", IEEE Instrumentation and Measurement Technology Conference, vol. 1 , pp. 525-529, year 2001.
International Search Report and Written Opinion—PCT/US2010/054332—International Search Authority, European Patent Office,Feb. 1, 2011 (071025).

* cited by examiner

*Primary Examiner* — Afsar M. Qureshi
(74) *Attorney, Agent, or Firm* — Eric Ho

(57) ABSTRACT

Disclosed are systems, methods and computer program products for measuring and reducing latency of radio link flows having different quality of service (QoS) reservations. An example method comprises establishing one or more radio link flows with an access gateway, wherein each radio link flow has a different QoS reservation, transmitting at least one transport layer protocol message having a predetermined size on each radio link flow to the echo service of the access gateway, receiving at least one response message on each radio link flow from the access gateway, computing the round trip time (RTT) for the transmitted and received messages on each radio link flow, and modifying QoS reservations of the one or more radio link flows based on the computed RTT for the one or more radio link flows.

50 Claims, 8 Drawing Sheets

| PRIORITY LEVEL | TRAFFIC TYPE |
| --- | --- |
| 0 | BEST EFFORT |
| 1 | BACKGROUND |
| 2 | STANDARD (SPARE) |
| 3 | EXCELLENT LOAD (BUSINESS CRITICAL) |
| 4 | CONTROLLED LOAD (STREAMING MULTIMEDIA) |
| 5 | VIDEO (INTERACTIVE MEDIA) <100 MS LATENCY AND JITTER |
| 6 | VOICE (INTERACTIVE VOICE) <10 MS LATENCY AND JITTER |
| 7 | NETWORK CONTROL RESERVED TRAFFIC LOWEST LATENCY AND JITTER |

FIG. 5

SYSTEMS AND METHODS FOR MEASURING AND REDUCING LATENCY OF RADIO LINK FLOWS

BACKGROUND

1. Field

This disclosure relates generally to the field of wireless communications and more specifically to the systems and methods for measuring and reducing latency of radio link flows having different quality of service (QoS) reservations.

2. Background

Wireless communication systems are widely deployed to provide various types of communication content such as voice, data, multimedia and other. These systems may be multiple-access systems capable of supporting communication with multiple mobile devices by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, Universal Mobile Telecommunications Systems (UMTS) including WCDMA, HSPA and HSUPA, 3GPP Long Term Evolution (LTE) systems, and other types of wireless communication systems.

High Data Rate (HDR) is a mobile wireless access technology developed by Qualcomm that provides support for personal broadband Internet services, such as voice over Internet protocol (VoIP), IP-TV, packet switched video telephony (PSVT), multimedia streaming, Web browsing and other services, on CDMA2000 (1xEV-DO), 3GPP and other wireless communication systems. One advantage of the HDR protocol is that is provides quality of service (QoS) resource reservation control mechanisms. Quality of service is the ability to provide different priority to different applications, users, or data flows, or to guarantee a certain level of performance to a data flow. For example, one or more of a required bit rate, delay, jitter, packet dropping probability or bit error rate may be guaranteed.

Many applications that require QoS control are sensitive to round-trip latency and must preserve strict inter-packet and intra-flow timing characteristics. Examples of such time-sensitive applications include streaming voice and video conferencing. Therefore, measurement of round-trip delay for these applications may be used to determine if the wireless communication system provides the quality of service requested by these applications. Historically, ICMP ping commands were used for measuring network delays. However, HDR systems typically do not support the ICMP protocol and do not provide any other mechanism for measuring latency on radio links. Accordingly, there is a need for a mechanism for measuring delays on QoS radio links of wireless communication systems.

SUMMARY

The following presents a simplified summary of one or more aspects of mechanisms for measuring latency on QoS radio link flows in a wireless communication environment. This summary is not an extensive overview of all contemplated aspects, and is intended to neither identify key or critical elements of the invention nor delineate the scope of any or all aspects thereof. Its sole purpose is to present some concepts of one or more aspects in a simplified form as a prelude to the more detailed description that is presented later.

Disclosed herein are various aspects of systems, methods and computer program products for measuring latency of a radio access network (RAN) and in particular round-trip time (RTT) between a mobile device and an IP access gateway, such, as a PDSN gateway, of the radio access network. In one aspect, the latency of multiple radio link flows, such as Radio Link Protocol (RLP) flows or Radio Link Control (RLC) flows, having different QoS reservations may be calculated. Since the latency measurements are limited to QoS flows across radio access network, and do not involve any time measurements on an attached IP network, the mechanism allows evaluating the performance of different QoS flows for purpose of optimization of QoS configuration at application, mobile device or RAN.

An example method comprises establishing one or more radio link flows between a mobile device and an IP access gateway, wherein each radio link flow has a different QoS reservation; transmitting on the one or more radio link flows having different QoS reservations one or more echo request messages to an echo service hosted by the access gateway; receiving on the one or more radio link flows having different QoS reservations one or more echo response messages from the echo service, wherein the echo response messages correspond to the echo request messages; calculating the round trip time (RTT) for the transmitted and received echo messages for each radio link flow having different QoS reservations; and optimizing QoS reservations of the one or more radio link flows based on the computed RTT for the one or more radio link flows having different QoS reservations.

Another example method comprise establishing one or more radio link flows between an IP access gateway and a mobile device, wherein each radio link flow has a different quality of service (QoS) reservation; activating an echo service on a predefined port of the access gateway; receiving on the one or more radio link flows having different QoS reservations one or more echo request messages from the mobile device; transmitting on the one or more radio link flows having different QoS reservations one or more echo response messages to the mobile device, wherein the echo response messages correspond to the echo request messages; and optimizing QoS reservations of the one or more radio link flows based on a round-trip time (RTT) between the received and transmitted echo messages.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects of the invention will hereinafter be described in conjunction with the appended drawings, provided to illustrate and not to limit the disclosed aspects, wherein like designations denote like elements, and in which:

FIG. 5 is an illustration an example QoS priority table utilized in establishing QoS radio link flows.

DETAILED DESCRIPTION

Figure 1:
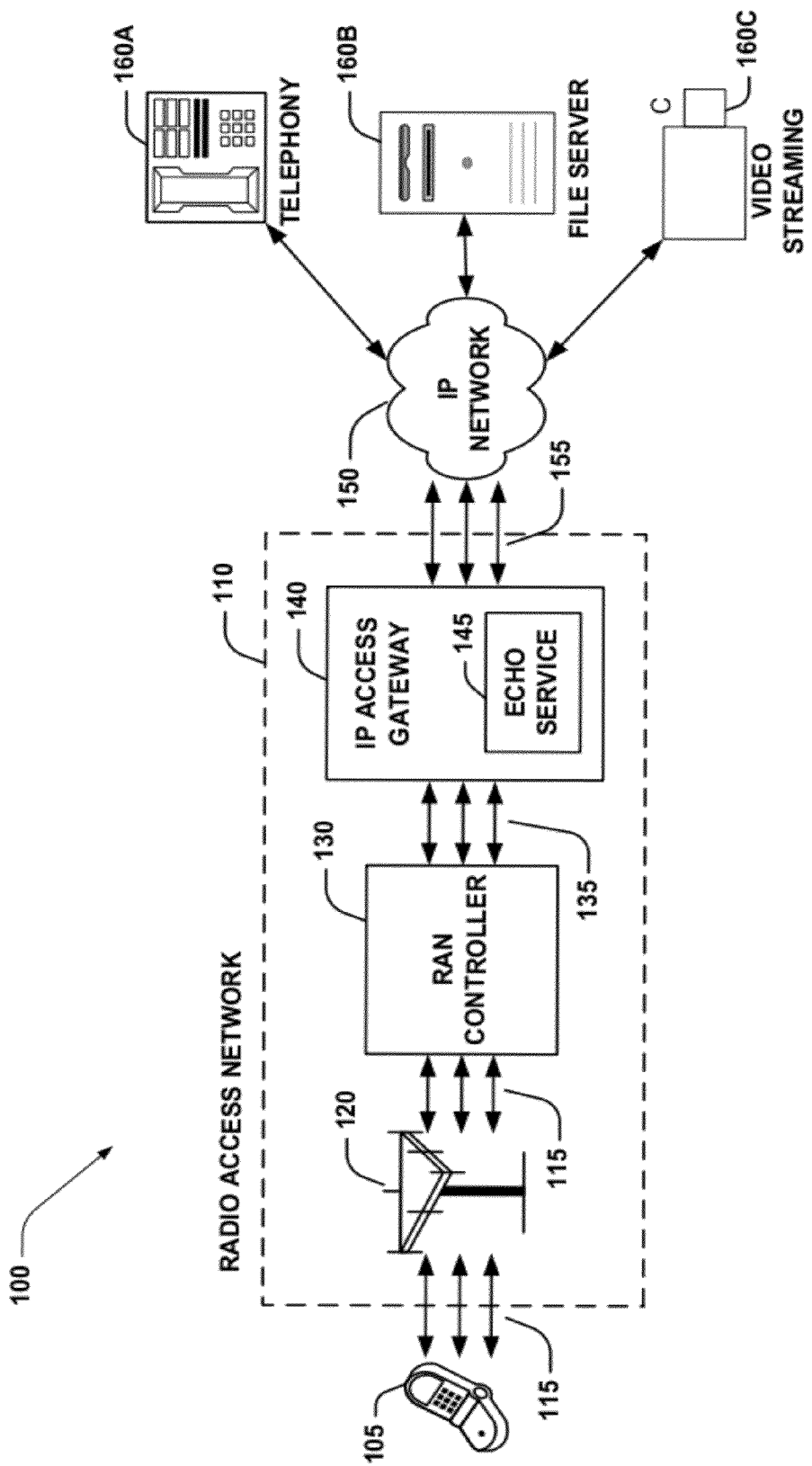
FIG. 1 is an illustration of a wireless communication system utilizing aspects of latency measurement mechanisms disclosed herein.

Various aspects of methodologies for measuring latency on QoS radio link flows in a wireless communication environment are now described with reference to the drawings. In the following description, for purposes of explanation, numerous specific details are set forth in order to provide a thorough understanding of one or more aspects. It may be evident, however, that such aspect(s) may be practiced without these specific details.

As used in this disclosure, the terms "component," "module," "system" and the like are intended to include a computer-related entity, such as but not limited to hardware, firmware, a combination of hardware and software, software, or software in execution. For example, a component may be, but is not limited to being, one or more of a process running on a processor, a processor, an object, an executable, a thread of execution, a program, or a computer. By way of illustration, both an application running on a computing device and the computing device can be a component. One or more components can reside within one or both of a process or a thread of execution and a component may be localized on one computer, distributed between two or more computers, or both. In addition, these components can execute from various computer readable media having various data structures stored thereon. The components may communicate by way of one or both of local or remote processes such as in accordance with a signal having one or more data packets, such as data from one component interacting with another component in one or more of a local system, a distributed system, or across a network such as the Internet or other types of packet-switched networks with other systems by way of the signal.

Moreover, various aspects or features of methodologies for measuring radio link latency described herein can be implemented as one or more of a method, apparatus, or article of manufacture using standard programming or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices or other machine-readable media for storing information. The term "machine-readable medium" can include, without being limited to, wireless channels and various other media capable of storing, containing, or carrying instruction(s) or data.

Various aspects or features of methodologies for network latency measurements in a wireless communication environment will be presented in terms of systems that may include a number of mobile devices, components, modules, and the like. It is to be understood and appreciated that the various systems may include additional devices, components, modules, etc. or may not include all of the devices, components, modules etc. discussed in connection with the figures. A combination of these approaches may also be used.

FIG. 1 illustrates one aspect of a wireless communication environment 100 that includes one or more mobile devices 105, one or more radio access networks (RAN) 110, IP network 150, such as the Internet, and a plurality of remote Internet servers that provide IP telephony 160A, file downloading 160B, video streaming 160C and other services through the IP network 150. In one aspect, mobile device 105 can be a cellular telephone, a cordless telephone, a Session Initiation Protocol (SIP) phone, a personal digital assistant (PDA), a handheld device having wireless connection capability, a laptop computer, or other processing device connected to a wireless modem. In one aspect, mobile device 105 may be a multi-mode communication device operable to access several different radio access networks 110. In general, mobile device 105 supports data, voice and video services, including broadband Internet services, such as Web browsing, voice over IP (VoIP), IP-TV, multimedia streaming, file downloading and other types of services. Mobile device 105 may also be called a subscriber unit, subscriber station, mobile station, mobile, remote station, remote terminal, access terminal, user terminal, terminal, wireless communication device, user agent, user device, or user equipment (UE).

In one aspect, RAN 110 may include, but are not limited to, CDMA, TDMA, FDMA, OFDMA, SC-FDMA, TD-SCDMA and other wireless communication systems. The terms "system" and "network" are used interchangeably herein. A CDMA system may implement a radio technology such as Universal Terrestrial Radio Access Network (UTRAN), cdma2000, etc. UTRAN includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRAN (E-UTRAN), Ultra Mobile Broadband (UMB), IEEE 802.11 (Wi-Fi), IEEE 802.16 (WiMAX), IEEE 802.20, Flash-OFDM, etc. UTRAN and E-UTRAN are part of Universal Mobile Telecommunication System (UMTS). 3GPP Long Term Evolution (LTE) is a release of UMTS that uses E-UTRAN, which employs OFDMA on the downlink and SC-FDMA on the uplink. UTRAN, E-UTRAN, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

RAN 110 provides mobile devices 105 with radio access to the IP network 150 (e.g., Internet). RAN 110 generally includes one or more radio base stations 120 having multiple antenna groups or a transmitter/receiver chain, or both, that can in turn comprise a plurality of components associated with radio signal transmission and reception (e.g., processors, modulators, multiplexers, antennas, etc. (not shown)) to and from mobile devices 105. RAN 110 further includes a controller 130 which provides data connectivity between mobile devices 105 and an IP access gateway 140. The main functions of the controller 110 include establishment, maintenance and termination of radio link flows 115; radio resource management; and mobility management. The radio link flows 115 may include, but are not limited to Radio Link Protocol (RLP) flows and Radio Link Control (RLC) flows. Each RLP flow 115 may include one or more IP data flows generated by the applications running on the mobile device 105. Mobile device 105 generally negotiates reservations with RAN controller 110 for different RLP flows for different services required by the applications running on the mobile device 105. Such services may include IP telephony, video streaming, web browsing, file transfer, SIP signaling, etc. Different reservations may have different QoS requirements; and thus before creating the requested RLP flow, controller 110 determines if RAN 110 has the resources necessary to support the requested QoS. For each new RLP flow 115, controller 130 creates A10/A11 bearer connections 135 to carry IP traffic from device 105 to access gateway 140.

Gateway 140, also known as medium access gateway (MAG), is a server or router that connects RAN 110 and IP network 150. In one aspect, gateway 140 may be implemented as a Packet Data Serving Node (PDSN). Generally, gateway 140 is responsible for tracking the mobile devices' movements to and from RAN 110, aggregating data traffic from RAN controllers 130 and providing access to the IP services 160. If system 100 supports Proxy Mobile IPv6 (PMIP) protocol, gateway 140 may also function as a proxy agent for mobile IPv4 and IPv6 packet transport, signaling and data transmission/reception to/from mobile devices 105 and services 160 provided by their home agents. For transporting data between mobile device 105 and services 160, gateway 140 creates bidirectional IP tunnels 155 to the respective services 160 and associates one or more RLP flow 115 carried by the A10/A11 bearer connections 135 from controller 130 to the created IP tunnels 155. When gateway 140 receives data through a RLP flow 115 from mobile device 105, it identifies service 160 to which the received data is addressed and the associated IP tunnel 155; it then encapsulates the received data in new IP packets and transmits them through the appropriate IP tunnel 155 to the service 160. When data is received through the IP tunnel from the service 160, gateway 140 de-encapsulates it, identifies the mobile device 105 to which the data is addressed and the associated RLP flow, and forwards the data to mobile device 105.

In one aspect, gateway 140 may host an echo service 145 which enables mobile devices 105 to simultaneously measure latency of multiple QoS flows 115, so as to assure that the required QoS is maintained by the RAN 110. In one aspect, mobile device 105 can send an echo request message using settable UDP packets, or using other transport layer protocols, such as TCP or the like, to an echo service 145 hosted by the gateway 140. The echo request messages may be sent on a particular (selected) QoS link flow 115 or simultaneously on multiple QoS flows 115. The sizes of the echo packets may be selected by the mobile device 105 to reflect the average size of packets transmitted on a given QoS flow or based on other considerations associated with communications on that flow. In one aspect, the echo service 145 may be configured to continuously listen on a predefined port of the gateway 140, e.g., port 7, for incoming echo messages, and automatically echo back the received message on the same RLP radio link flow on which the message was received.

Once the response echo message is received at the mobile device 105, the mobile device may calculate round trip time (RTT) from the time when the echo request message was sent to the echo service 145 till the time the response echo message was received by the mobile device 105. Since every QoS link flow 115 is bound by network parameters that are negotiated or settable by the RAN 110, the RTT for each QoS flow will reflect the actual network latency on each radio link flow 115. The mobile device 105 may then determine if the actual latency of each QoS flow 115 conforms to the latency specified in the QoS reservation for each QoS flow 115. For example, a specified latency for a video radio link flow may be about 0.2 seconds and a specified latency for an audio radio link flow may be about 0.05 seconds. If the measured radio link latency exceeds the specified latency of the QoS reservation for the given radio link flow, mobile device 105 may try to modify QoS reservations for one or more radio link flows 115 to improve latency performance of the individual QoS flows 115 as well as overall system performance.

In one aspect, mobile device 105 may request RAN 110 to adjust radio link parameters and associated MAC parameters to improve the latency of one or more radio link flows 115. For example, mobile device 105 may send to RAN 110 data rate control (DRC) messages on one or more QoS flows 115 requesting the RAN to increase the data transmission rates for these radio link flows. An increase in the data rate generally causes an improvement in the latency of transmissions. In another example, RAN 110 may increase the number of radio channels, such as CDMA, FDMA or TDMA channels, assigned to carry data for a given QoS flow 115, thereby increasing bandwidth of the given QoS flow and improving latency of transmission. Yet in another example, RAN 110 may adjust assignment of forward and reverse radio channels between several radio link flows 115, thereby increasing the number of radio channels available to QoS flows requiring improvement in latency and decreasing the number of available radio channels used by QoS flows having less strict latency requirements. Other modifications to radio link and MAC parameters of QoS flows may include, but are not limited to, modifying sequence space length, using dynamic rate control, using short vs. multi user packet transmission schemes, modifying transmission scheduling algorithms or channel access schemes for mobile devices 105 and others.

In another aspect, mobile device 105 may improve latency of data transmissions having certain QoS requirements by transmitting such data on another QoS flow having better transmission latency than the currently used QoS flow. Furthermore, the mobile device 105 may designate different sets of radio link flows 115 for transmitting different types of data, which each set of flows 115 having different QoS reservations. This scheme would further increase data rate and throughput between the mobile device 105 and RAN 110. In yet another aspect, mobile device 105 may improve latency of data transmissions having certain QoS requirements by transferring one or more radio link flows 115 to another carrier operating on a different frequency band on RAN 110. For example, DO Rev B (HDR Rev B) as well as OFDMA and LTE systems allow multiple radio links flows over different frequencies at the same time, which allows for higher data rates on the individual radio links 115 and improved overall system throughput. Thus, a mobile device 105 operating on one of these multi-carrier networks may transfer radio link flows 115 between different carriers on the same radio access network to achieve the desired latency requirements. In another aspect, the mobile device 105 may transfer one or more radio link flows 115 to another available RAN if RAN 110 cannot provide the QoS requested by the mobile device. Yet in another aspect, if the mobile device 105 fails to improve latency on one or more flows 115 using techniques described above, the mobile device 105 may terminate those radio link flows 115.

Figure 2:
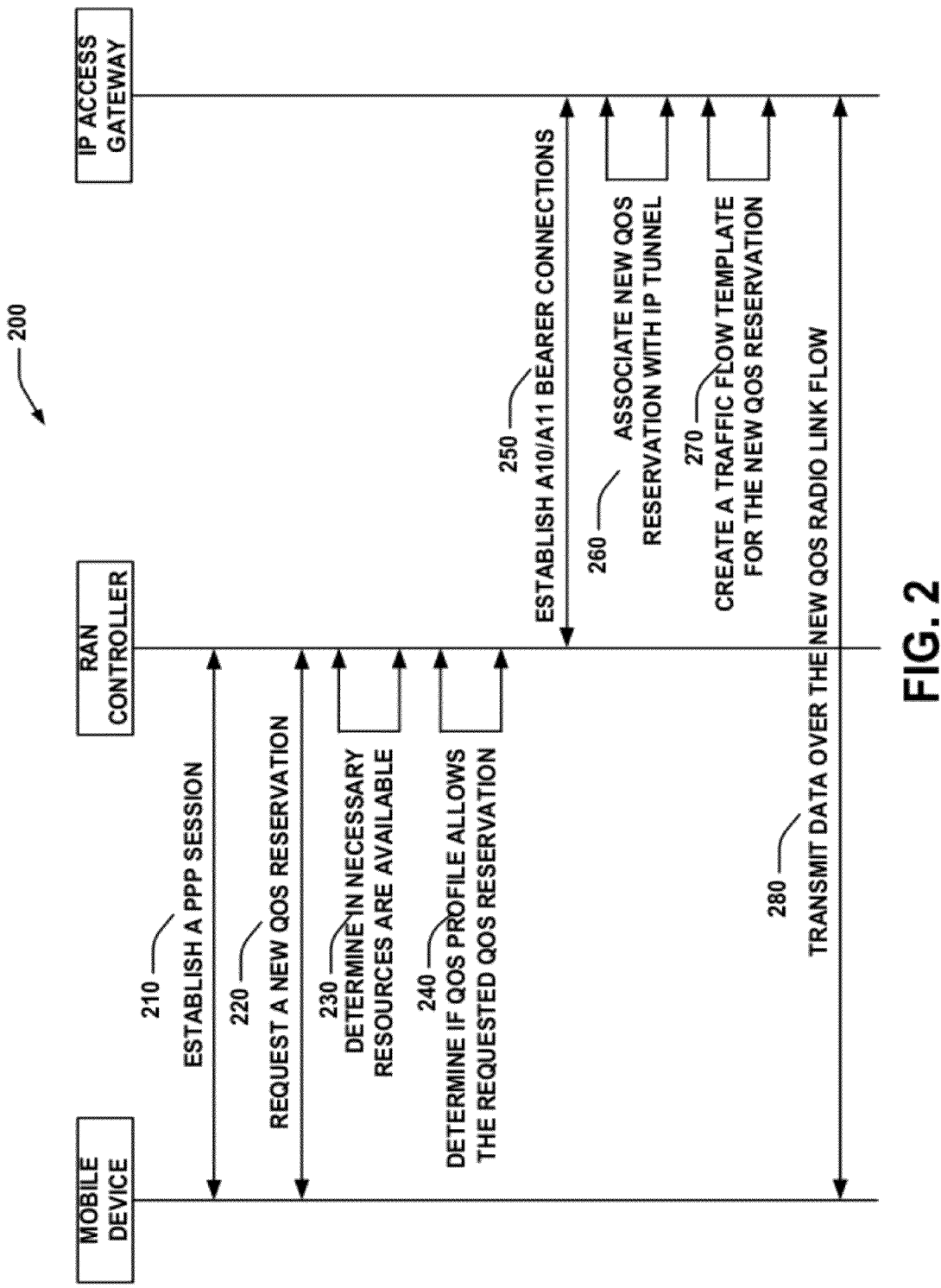
FIG. 2 is an illustration of an example methodology for establishing QoS radio link flows.

FIG. 2 illustrates one example of the methodology for creating a QoS radio link flow between mobile device 105 and RAN 110. At step 210, a PPP session is established between mobile device 105 and RAN controller 130. During session setup, physical layer subtype 2, enhanced forward traffic channel MAC protocol, reverse traffic channel MAC subtype 3 protocol, and multi-flow packet application, and their associated parameters may be negotiated and committed. In addition, the stream configuration is also performed during session negotiation. At step 220, mobile device 105 sends a QoS flow request to RAN controller 130 using the IS-856A OTA signaling. At step 230, controller 130 may determine if RAN 110 has the necessary resources to support the requested QoS reservation without negatively effecting existing services provided by the network. Controller 130 may use the following network parameters to determine whether to accept or deny a new QoS reservation: requested data rate, available bandwidth and network latency; amount of data in forward link queue; channel conditions at the mobile device; number of active users in the sector/cell; priority of application flow, such as best effort, video, voice, etc. FIG. 5 illustrates an example priority level table 500 for various traffic types in a wireless communication system.

If the requested network resources are available, at step 240, controller 130 may check QoS profile of the mobile device 105 to determine if the device is allowed to make the requested QoS reservation. The QoS profile may include the following parameters: Maximum Authorized Aggregate Bandwidth for Best Effort Traffic parameter indicating the maximum bandwidth that may be allocated to a user for best effort traffic initiated or received by the user; Maximum per Flow Priority parameter indicating the maximum priority that the user can specify for a packet data flow; Inter-user priority for Best Effort Traffic parameter indicating the grade of service that the user are authorized for best effort traffic; and other parameters known to those of skill in the art. If the QoS profile for the mobile device 105 is not available, controller 130 may request it from access gateway 140. If mobile device 105 is roaming in the RAN 110, the gateway 140 may not have the QoS profile for the mobile device 105, and it may request the necessary QoS profile from the mobile device's home network. Based on the information contained in the QoS profile, controller 130 can decide whether to accept or deny the mobile device's request for the new QoS reservation.

If controller 130 accepts the QoS reservation from the mobile device 105, at step 250, controller 130 may set up A10/A11 bearer connections 135 to the gateway 140 for transmission of IP traffic for the given QoS flow to and from mobile device 105. At step 260, gateway 140 determines what service 160 is being requested by mobile device 105 and determines if an IP tunnel 155 already exists for the requested service. If an IP tunnel 155 already exists, gateway 140 associates the new QoS flow with that IP tunnel. Otherwise, gateway 140 creates a new IP tunnel 155 to the requested service 160 and associates the new QoS flow with that IP tunnel. At step 270, gateway 140 may also determine if a Traffic Flow Template (TFT) already exists for the requested QoS reservation. TFT is a packet filter used by gateway 140 to provide specific flow treatments to different types of QoS reservations. For example, there can be a first TFT for voice service 160A, a second TFT for file download service 160B, a third TFT for video streaming service 160C, as well as other TFTs for different QoS reservations. Once the IP tunnel and the TFT for the new QoS flow 115 are set up by gateway 140, at step 280, mobile device 105 may begin to transmit data using the new QoS flow through the RAN 110 and the IP network 150 to the associated service 160. In this manner, mobile device may establish multiple RLP flows with different QoS characteristics.

Figure 3:
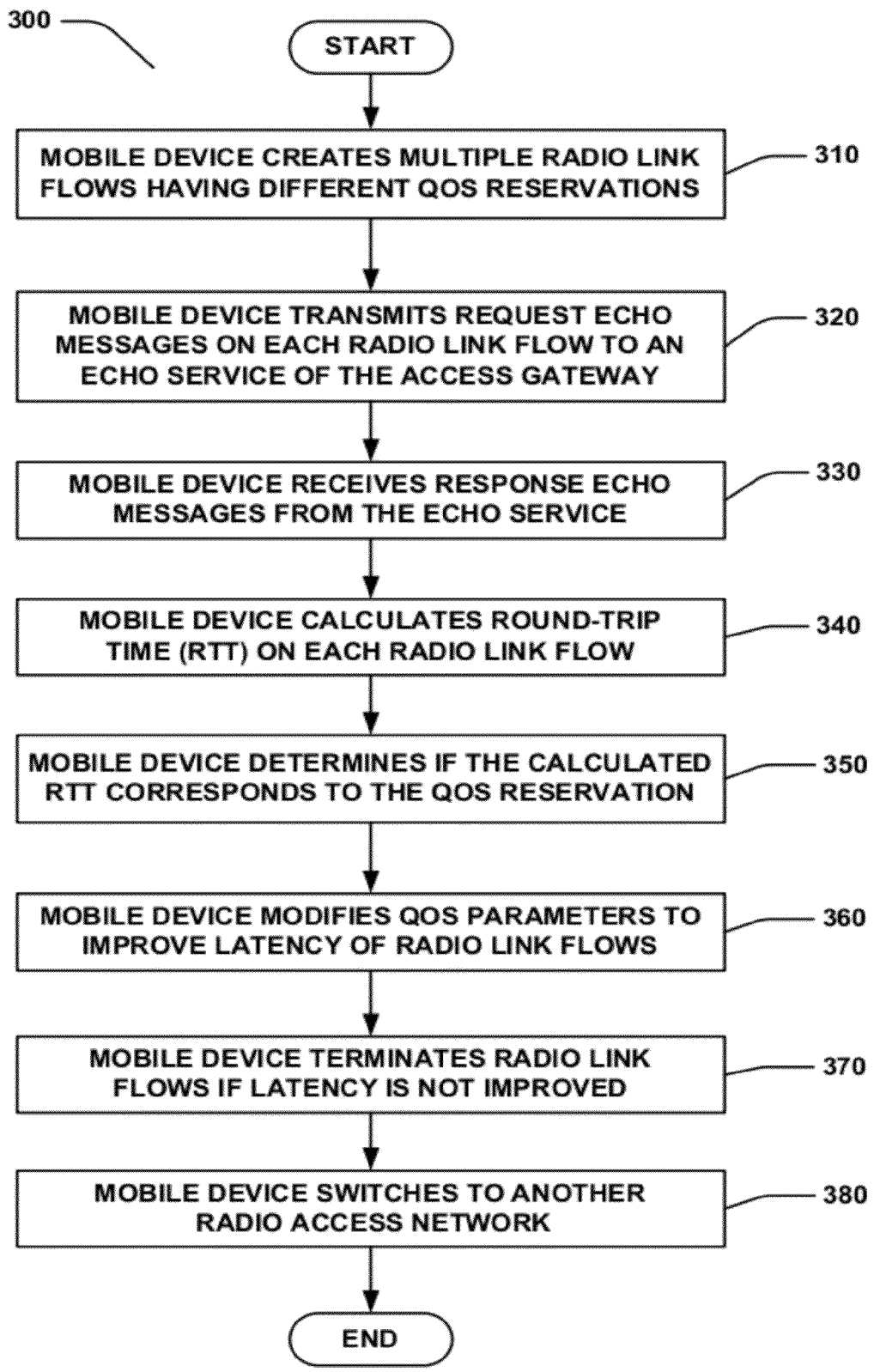
FIG. 3 is an illustration of an example methodology for measuring latency of QoS radio link flows.

FIG. 3 illustrates one example methodology implemented at a mobile device for measuring latency of QoS flows. At step 310, mobile device 105 establishes multiple QoS flows 115 to the access gateway 140. At step 320, mobile device 105 may send on one or more of its QoS flows 115 UDP echo request messages to the echo service 145 running on a predefined port, e.g., port 7, of the access gateway 140. The sizes of the UDP packets may be different on different QoS flows 115. Upon receipt of the echo response messages on QoS flows 115 from the echo service 145, at step 330, mobile device 105 may calculate round trip time (RTT) for each QoS flow 115, at step 340. At step 350, mobile device 105 determines if the actual calculated radio link latency of each QoS flow 115 conforms to the QoS reservations of the mobile device 105. If the measured radio link latency exceeds the requested QoS reservation for the given radio link flow, at step 360, mobile device 105 tries to modify QoS reservations to improve transmission latency for one or more QoS flows 115 by one or more of: (i) requesting RAN 110 to adjust radio link or MAC parameters for one or more radio link flow 115; or (ii) select another radio link flow(s) having better QoS characteristics for transmission of data to/from the mobile device 105. If the mobile device 105 fail to reduce latency for the one or more QoS flows 115, at step 370, mobile device 105 may terminate that radio link flow altogether, select another radio link flow 115 having better latency or select another carrier on RAN 110 operating in a different frequency band and having better latency. At step 380, the mobile device 105 may switch to another available RAN if RAN 110 cannot provide the QoS requested by the mobile device.

Figure 4:
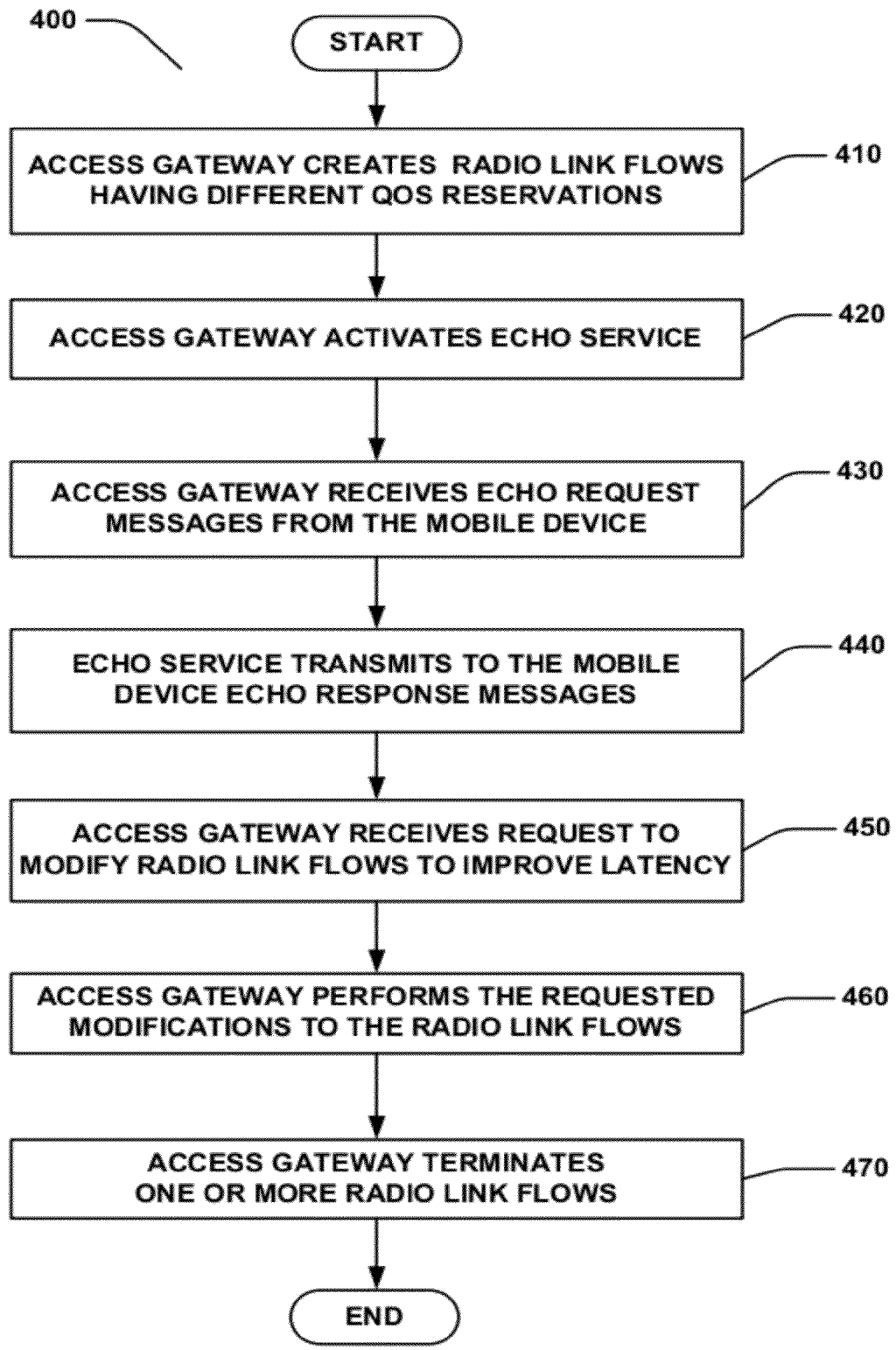
FIG. 4 is an illustration of an example methodology for improving latency of QoS radio link flows.

FIG. 4 illustrates one example methodology implemented at an access gateway for improving latency of QoS flows. At step 410, access gateway 140 establishes multiple QoS flows 115 on the respective A10/A11 bearer connections 135 with a mobile device 105. At step 420, gateway 140 activates the echo service 145 that listens on a predefined port, e.g., port 7, for any incoming messages on bearer connections 135. At step 430, access gateway 140 receives from the mobile device 105 one or more UDP echo request messages on one or more QoS flows 115. At step 440, the echo service 145 sends echo response messages on the respective QoS flows 115 to the mobile devices 105. At step 450, access gateway 140 receives requests from the mobile device 105 to modify one or more QoS flows 115 to improve latency of transmission on these radio link flows. At step 460, access gateway 140 performs the requested modifications, which may include modifying QoS characteristics of the traffic flow template (TFT) associated with the QoS flows 115 or reassigning data transmissions having certain latency requirement to other QoS flows having shorter transmission latency. At step 470, access controller 140 may terminate certain QoS flows 115 upon request from the mobile device 105 if transmission latency on those flows has not improved.

The above disclosed methodologies for improving latency of radio link flows may have one or more of the following advantages. First, the method may allow a mobile device 105, and in particular various applications running on the mobile device, to perform latency measurements on radio link flows 115 to assure that the radio access network 110 provides the requested quality of service. Second, the round-trip time measurements can be performed simultaneously on multiple radio link flows, which allows the mobile device 105 to compare performance of multiple radio link flows and to chose a flow best suitable for transmission of data having particular latency requirements. Third, the RTT measurements are performed over the radio access network only and do not involve any transmission time measurements on the attached IP network, on which the transmission latency is much harder to predict and control due to the unreliable, best effort delivery characteristics of the IP network. Fourth, the mobile device 105 can request RAN 110 to modify radio link or MAC parameters to improve latency of transmission for its time-sensitive data traffic. Other advantages of the various aspects of disclosed methodologies will be apparent to those of skilled in the art.

Figure 6:
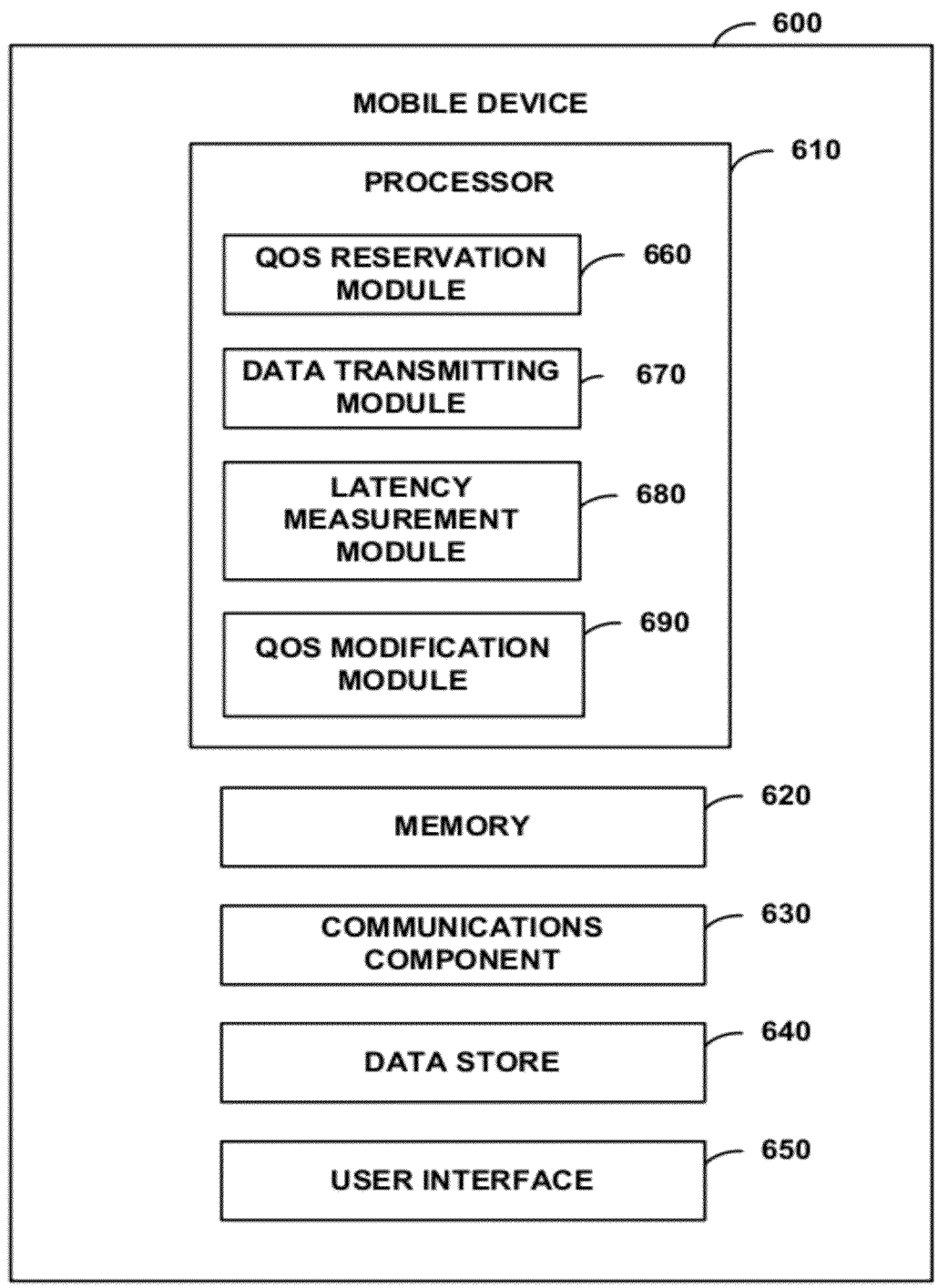
FIG. 6 is an illustration of an example mobile device utilizing aspects of latency measurement mechanisms disclosed herein.

FIG. 6 illustrates an example mobile device 600 operable to perform radio link delay measurements in accordance with methodologies disclosed herein. Mobile device 600 includes a processor 610 for carrying out processing functions associated with radio link delay measurements and link optimization in accordance with the methodologies disclosed herein as well as other functions. Processor 610 can include a single or multiple set of processors or multi-core processors. In one example aspect, processor 610 may include a QoS reservation module 660 that implements procedures for establishment, maintenance and termination of radio link flows having different QoS reservations. Processor 610 may also include a data transmission module 670 for transmitting/receiving data to/from the radio access network using established QoS flows. Processor 610 may also include a latency measurement module 680 that implements the latency measurement procedures disclosed herein. Processor 610 also includes a QoS optimization module 690 that facilitates optimization of various network parameters to improve QoS of the radio link flows.

Mobile device 600 further includes a memory 620 coupled to processor 610, such as for storing local versions of applications being executed by processor 610 as well as radio link latency measurement algorithms. Memory 620 can include any type of memory usable by a computer, such as random access memory (RAM), read only memory (ROM), magnetic discs, optical discs, volatile memory, non-volatile memory, and any combination thereof. Additionally, mobile device 600 may further include a data store 640 coupled to processor 610, which can be any suitable combination of hardware or software, that provides for mass storage of information, databases, and programs employed in connection with aspects described herein. For example, data store 640 may be a data repository for applications not currently being executed by processor 610 as well as files containing algorithms for the measurement of radio link latency and various data associated therewith.

Further, mobile device 600 includes a communications component 630 coupled to processor 610 for searching, establishing and maintaining communications with one or more radio access networks utilizing hardware, software, and services as described herein. For example, communications component 630 may include transmit chain components and receive chain components associated with a transmitter and receiver, respectively, operable for interfacing with wireless communication systems and devices of various radio access technologies and protocols. Processor 610 may further include a data transmission module for instructing communications component 630 to transmit/receive data to/from one or more wireless communication systems.

Mobile device 600 may include a user interface component 650 coupled to processor 550 and being operable to receive inputs from a user of mobile device 650 and further operable to generate outputs for presentation to the user. Component 650 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, component 650 may include one or more output devices, including but not limited to a display, a speaker, a haptic feedback mechanism, a printer, any other mechanism capable of presenting an output to a user, or any combination thereof.

Figure 7:
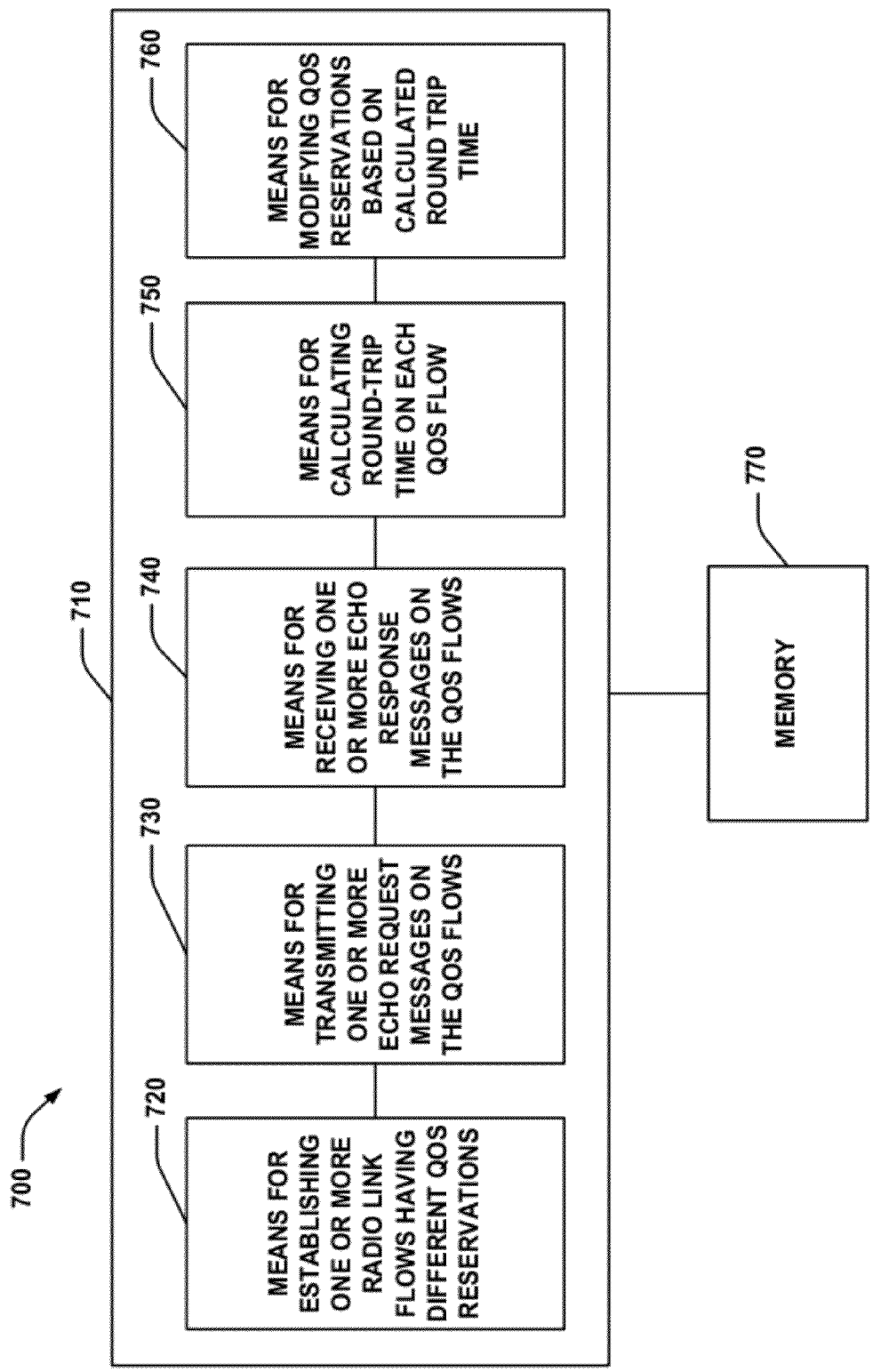
FIG. 7 is an illustration of an example system utilizing aspects of latency measurement mechanisms disclosed herein.

FIG. 7 illustrates a system 700 that may be implemented in a mobile device. As depicted, system 700 includes functional blocks that can represent functions implemented by a processor, software, or combination thereof (e.g., firmware). System 700 includes a logical grouping 710 of electrical components that facilitate execution of algorithms for measuring latency of radio link flows having different QoS reservations as disclosed herein. Logical grouping 710 can include means 720 for establishing one or more radio link flows between a mobile device and an access gateway, wherein each radio link flow has different quality of service (QoS) reservation. Further, logical grouping 710 includes means 730 for transmitting on the one or more radio link flows having different QoS reservations one or more echo request messages to an echo service hosted by the access gateway. In addition, logical grouping 710 includes means 740 for receiving on the one or more radio link flows having different QoS reservations one or more echo response messages from the echo service, wherein the echo response messages correspond to the echo request messages. Further, logical grouping 710 includes means 750 for calculating the round trip time (RTT) for the transmitted and received echo messages for each radio link flow having different QoS reservations. Lastly, logical grouping 710 includes means 760 for optimizing QoS reservations of the one or more radio link flows based on the computed RTT for the one or more radio link flows having different QoS reservations. System 700 also includes a memory 760 that retains instructions for executing functions associated with electrical components 720-760. While shown as being external to memory 770, it is to be understood that electrical components 720-760 can exist within memory 770 of the mobile device.

Figure 8:
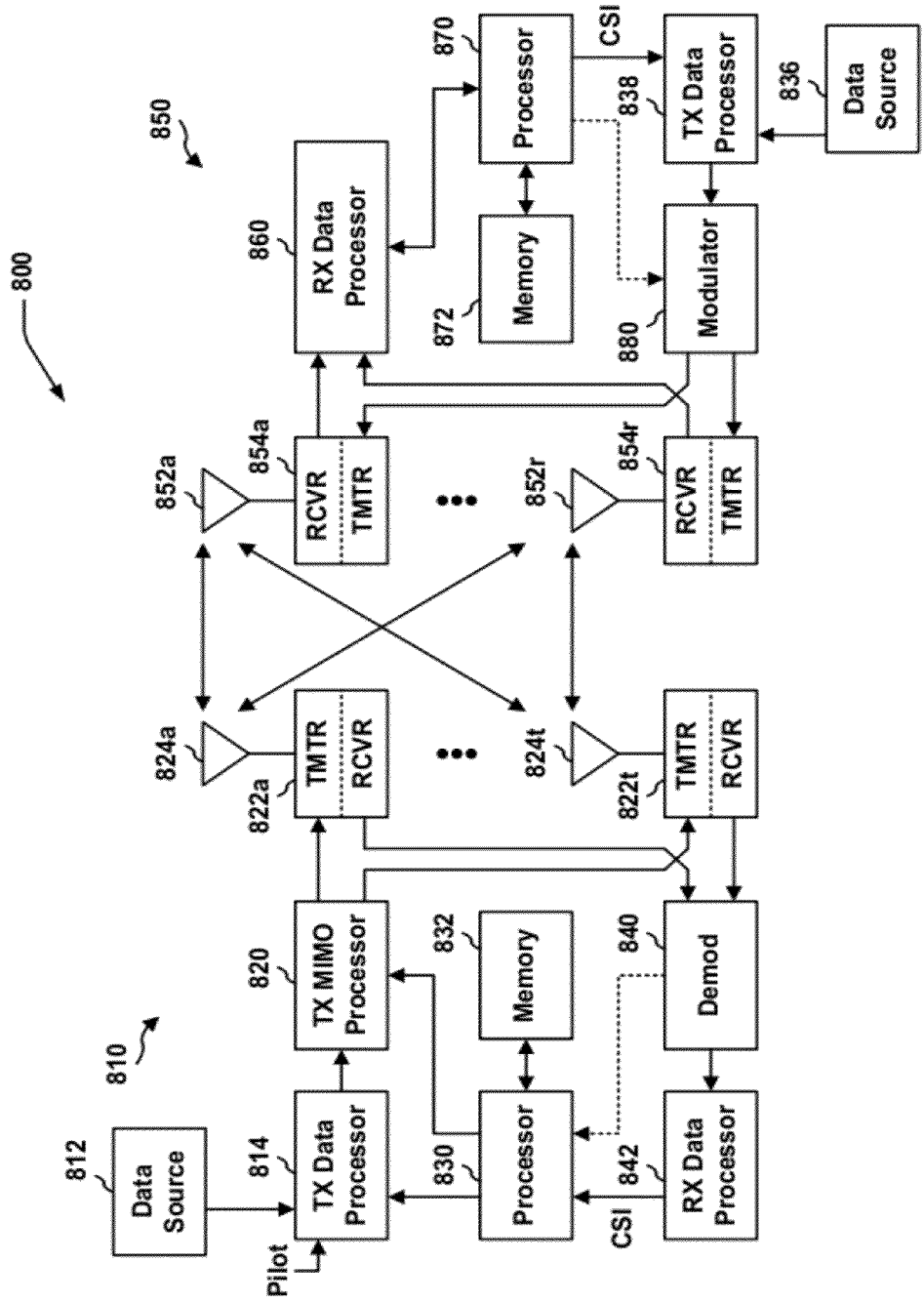
FIG. 8 is an illustration of an example wireless communication system utilizing aspects of latency measurement mechanisms disclosed herein.

FIG. 8 shows an example of a wireless communication system 800 in which various aspects of the methodologies for network latency measurement may be implemented. The system 800 depicts one base station/forward link transmitter 810 in a radio access network and one mobile device 850 for sake of brevity. However, it is to be appreciated that system 800 can include more than one base station/forward link transmitter or more than one mobile device, or both, wherein additional base stations/transmitters or mobile devices can be substantially similar or different from example base station/forward link transmitters 810 and mobile device 850 described below. In addition, it is to be appreciated that base station/forward link transmitter 810 or mobile device 850, or both, can employ the systems (FIGS. 1, 5, 6 and 7) or methods (FIGS. 2, 3 and 4), or both, described herein to facilitate latency measurement procedures and wireless communication there between.

At base station/forward link transmitter 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides NT modulation symbol streams to NT transmitters (TMTR) 822*a* through 822*t*. In various aspects, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 822*a* through 822*t* are transmitted from NT antennas 824*a* through 824*t*, respectively.

At mobile device 850, the transmitted modulated signals are received by NR antennas 852*a* through 852*r* and the received signal from each antenna 852 is provided to a respective receiver (RCVR) 854*a* through 854*r*. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the NR received symbol streams from NR receivers 854 based on a particular receiver processing technique to provide NT "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station/forward link transmitter 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link or the received data stream. The reverse link message can be processed by a TX data processor 838, which also receives traffic data for a number of data streams from a data source 836, modulated by a modulator 880, conditioned by transmitters 854*a* through 854*r*, and transmitted back to base station/forward link transmitter 810.

At base station/forward link transmitter 810, the modulated signals from mobile device 850 can be received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights. It is to be appreciated that in the case of a forward link transmitter 810, as opposed to a base station, these RX components may not be present since data is only broadcasted over the forward link.

Processors 830 and 870 can direct (e.g., control, coordinate, manage, etc.) operation at base station/forward link transmitter 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means known in the art.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps or actions described above.

Further, the steps or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps or actions of a method or algorithm may reside as one or any combination or set of codes or instructions on a machine readable medium or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

What is claimed is:

1. A method for wireless communication comprising:
    establishing one or more radio link flows between a mobile device and an Internet Protocol (IP) access gateway of a radio access network, wherein each radio link flow has a different quality of service (QoS) reservation;
    transmitting on the one or more radio link flows having different QoS reservations one or more echo request messages to an echo service hosted by the access gateway;
    receiving on the one or more radio link flows having different QoS reservations one or more echo response messages from the echo service, wherein the echo response messages correspond to the echo request messages;
    calculating the round trip time (RTT) for the transmitted and received echo messages for each radio link flow having different QoS reservations; and
    modifying QoS reservations of the one or more radio link flows based on the computed RTT for the one or more radio link flows having different QoS reservations to reduce latency of transmissions on one or more radio link flows.

2. The method of claim 1, wherein the RTT is calculated between the mobile device and the access gateway.

3. The method of claim 1, wherein the access gateway includes a PDSN gateway.

4. The method of claim 1, wherein the echo message is a transport layer protocol message.

5. The method of claim 4, wherein the transport layer protocol is one of a Universal Datagram Protocol (UDP) and Transport Control Protocol (TCP).

6. The method of claim 1, wherein the radio link flow is one of a radio link protocol (RLP) flow and a radio link control (RLC) flow.

7. The method of claim 1, further comprising selecting a size of the echo request message.

8. The method of claim 7, wherein the size of the echo request message is proportional to an average size of a data message associated with a radio link flow.

9. The method of claim 1, wherein modifying QoS reservations includes causing adjusting of one or more radio link or MAC parameters of one or more radio link flows on the radio access network.

10. The method of claim 1, wherein modifying QoS reservations includes selecting at least one other radio link flow having a better RTT for transmission of data to/from the mobile device.

11. The method of claim 1, wherein modifying QoS reservations further includes transferring one or more radio link flows to another carrier on the radio access network.

12. The method of claim 1, wherein modifying QoS reservations further includes transferring one or more radio link flows to another radio access network upon failure to reduce latency of the radio link flows on the radio access network.

13. The method of claim 1, wherein modifying QoS reservations includes terminating a radio link flow having RTT that exceeds radio link flow latency allowed by the QoS reservation.

14. A wireless communication system, comprising:
    a processor and a communications component coupled to the processor, the processor being configured to
    establish using the communication component one or more radio link flows between a mobile device and an IP access gateway of a radio access network, wherein each radio link flow has a different quality of service (QoS) reservation;
    transmit on the one or more radio link flows having different QoS reservations one or more echo request messages to an echo service hosted by the access gateway;
    receive on the one or more radio link flows having different QoS reservations one or more echo response messages from the echo service, wherein the echo response messages correspond to the echo request messages;
    calculate the round trip time (RTT) for the transmitted and received echo messages for each radio link flow having different QoS reservations; and
    modify QoS reservations of the one or more radio link flows based on the computed RTT for the one or more radio link flows having different QoS reservations to reduce latency of transmissions on one or more radio link flows.

15. The system of claim 14, wherein the RTT is calculated between the mobile device and the access gateway.

16. The system of claim 14, wherein the access gateway includes a PDSN gateway.

17. The system of claim 14, wherein the echo message is a transport layer protocol message.

18. The system of claim 17, wherein the transport layer protocol is one of a Universal Datagram Protocol (UDP) and Transport Control Protocol (TCP).

19. The system of claim 14, wherein the radio link flow is one of a radio link protocol (RLP) flow and a radio link control (RLC) flow.

20. The system of claim 14, wherein the processor being further configured to select a size of the echo request message.

21. The system of claim 20, wherein the size of the echo request message is proportional to an average size of a data message associated with a radio link flow.

22. The system of claim 14, wherein to modify QoS reservations, the processor being further configured to cause adjusting of one or more radio link or MAC parameters of one or more radio link flows on the radio access network.

23. The system of claim 14, wherein to modify QoS reservations, the processor being further configured to select at least one other radio link flow having a better RTT for transmission of data to/from the mobile device.

24. The system of claim 14, wherein to modify QoS reservations, the processor being further configured to transfer one or more radio link flows to another carrier on the radio access network.

25. The system of claim 14, wherein to modify QoS reservations, the processor being further configured to transfer one or more radio link flows to another radio access network upon failure to reduce latency of the radio link flows on the radio access network.

26. The system of claim 14, wherein to modify QoS reservations, the processor being further configured to terminate a radio link flow having RTT that exceeds radio link flow latency allowed by the QoS reservation.

27. A non-transitional computer-readable medium comprising:
a first set of codes for causing a computer to establish one or more radio link flows between a mobile device and an IP access gateway of a radio access network, wherein each radio link flow has a different quality of service (QoS) reservation;
a second set of codes for causing the computer to transmit on the one or more radio link flows having different QoS reservations one or more echo request messages to an echo service hosted by the access gateway;
a third set of codes for causing the computer to receive on the one or more radio link flows having different QoS reservations one or more echo response messages from the echo service, wherein the echo response messages correspond to the echo request messages;
a fourth set of codes for causing the computer to calculate the round trip time (RTT) for the transmitted and received echo messages for each radio link flow having different QoS reservations; and
a fifth set of codes for causing the computer to modify QoS reservations of the one or more radio link flows based on the computed RTT for the one or more radio link flows having different QoS reservations to reduce latency of transmissions on one or more radio link flows.

28. A non-transitional computer-readable medium of claim 27, wherein the RTT is calculated between the mobile device and the access gateway.

29. A non-transitional computer-readable medium of claim 27, wherein the fifth set of codes further includes a sixth set of codes for causing the computer to adjust one or more radio link or MAC parameters of one or more radio link flows on the radio access network.

30. A non-transitional computer-readable medium of claim 27, wherein the fifth set of codes further includes a seventh set of codes for causing the computer to select at least one another radio link flow having a better RTT for transmission of data to/from the mobile device.

31. A non-transitional computer-readable medium of claim 27, wherein the fifth set of codes further includes an eight set of codes for causing the computer to transfer one or more radio link flows to another carrier on the radio access network.

32. A non-transitional computer-readable medium of claim 27, wherein the fifths set of codes further includes a ninth set of codes for causing the computer to transfer one or more radio link flows to another radio access network upon failure to reduce latency of the radio link flows on the radio access network.

33. A non-transitional computer-readable medium of claim 27, wherein the fifth set of codes further includes a tenth set of codes for causing the computer to terminate a radio link flow having RTT that exceeds radio link flow latency allowed by the QoS reservation.

34. An apparatus, comprising:
means for establishing one or more radio link flows between a mobile device and an access gateway, wherein each radio link flow has a different quality of service (QoS) reservation;
means for transmitting on the one or more radio link flows having different QoS reservations one or more echo request messages to an echo service hosted by the access gateway;
means for receiving on the one or more radio link flows having different QoS reservations one or more echo response messages from the echo service, wherein the echo response messages correspond to the echo request messages;
means for calculating the round trip time (RTT) for the transmitted and received echo messages for each radio link flow having different QoS reservations; and
means for modifying QoS reservations of the one or more radio link flows based on the computed RTT for the one or more radio link flows having different QoS reservations to reduce latency of transmissions on one or more radio link flows.

35. The apparatus of claim 34, wherein the RTT is calculated between the mobile device and the access gateway.

36. The apparatus of claim 34, wherein means for modifying QoS reservations further include means for adjusting one or more radio link or MAC parameters of one or more radio link flows on the radio access network.

37. The apparatus of claim 34, wherein means for modifying QoS reservations further include means for selecting at least one other radio link flow having a better RTT for transmission of data to/from the mobile device.

38. The apparatus of claim 34, wherein means for modifying QoS reservations further include means for transferring one or more radio link flows to another carrier on the radio access network.

39. The apparatus of claim 34, wherein means for modifying QoS reservations further include means for transferring one or more radio link flows to another radio access network upon failure to reduce latency of the radio link flows on the radio access network.

40. The apparatus of claim 34, wherein means for modifying QoS reservations further include means for terminating a radio link flow having RTT that exceeds radio link flow latency allowed by the QoS reservation.

41. A method for wireless communication comprising:
establishing one or more radio link flows between an IP access gateway of a radio access network and a mobile device, wherein each radio link flow has a different quality of service (QoS) reservation;
activating an echo service on a predefined port of the access gateway;
receiving on the one or more radio link flows having different QoS reservations one or more echo request messages from the mobile device;
transmitting by the echo service on the one or more radio link flows having different QoS reservations one or more echo response messages to the mobile device, wherein the echo response messages correspond to the echo request messages; and
modifying QoS reservations of the one or more radio link flows based on a round-trip time (RTT) between the received and transmitted echo messages to reduce latency of transmissions on one or more radio link flows.

42. The method of claim 41, wherein the RTT is calculated between the mobile device and the access gateway.

43. The method of claim 41, wherein modifying QoS reservations further includes adjusting one or more radio link or MAC parameters of one or more radio link flows on the radio access network.

44. The method of claim 41, wherein modifying QoS reservations further includes selecting at least one another radio link flow having a better RTT for transmission of data to/from the mobile device.

45. The method of claim 41, wherein modifying QoS reservations further includes terminating a radio link flow having RTT that exceeds radio link flow latency allowed by the QoS reservation.

46. A wireless communication system, comprising:
a processor and a communications component coupled to the processor, the processor being configured to
establish using the communication component one or more radio link flows between an IP access gateway of a radio access network and a mobile device, wherein each radio link flow has a different quality of service (QoS) reservation;
activate an echo service on a predefined port of the access gateway;
receive on the one or more radio link flows having different QoS reservations one or more echo request messages from the mobile device;
transmit by the echo service on the one or more radio link flows having different QoS reservations one or more echo response messages to the mobile device, wherein the echo response messages correspond to the echo request messages; and
modify QoS reservations of the one or more radio link flows based on a round-trip time (RTT) between the received and transmitted echo messages to reduce latency of transmissions on one or more radio link flows.

47. The system of claim 46, wherein the RTT is calculated between the mobile device and the access gateway.

48. The system of claim 46, wherein to modify QoS reservations, the processor being further configured to adjust one or more radio link or MAC parameters of one or more radio link flows on the radio access network.

49. The system of claim 46, wherein to modify QoS reservations, the processor being further configured to select at least one another radio link flow having a better RTT for transmission of data to/from the mobile device.

50. The system of claim 46, wherein to modify QoS reservations, the processor being further configured to terminate a radio link flow having RTT that exceeds radio link flow latency allowed by the QoS reservation.

* * * * *